(12) United States Patent
Billington et al.

(10) Patent No.: US 10,180,310 B2
(45) Date of Patent: Jan. 15, 2019

(54) MOBILE TARGET CARRIER FOR GUN RANGE WITH COUPLED MOBILE PROJECTOR

(71) Applicant: MEGGITT TRAINING SYSTEMS, INC., Suwanee, GA (US)

(72) Inventors: Scott A. Billington, Suwanee, GA (US); Carter C. Bennett, Buford, GA (US)

(73) Assignee: MEGGITT TRAINING SYSTEMS, INC., Suwanee, GA (US)

( * ) Notice: Subject to any disclaimer, the term of this patent is extended or adjusted under 35 U.S.C. 154(b) by 0 days.

(21) Appl. No.: 15/373,446

(22) Filed: Dec. 8, 2016

(65) Prior Publication Data

US 2018/0164082 A1    Jun. 14, 2018

(51) Int. Cl.
| | |
|---|---|
| *F41J 13/00* | (2009.01) |
| *F41J 9/14* | (2006.01) |
| *G03B 21/10* | (2006.01) |
| *G03B 21/14* | (2006.01) |
| *F41J 7/02* | (2006.01) |
| *F41J 7/00* | (2006.01) |

(52) U.S. Cl.
CPC . *F41J 9/14* (2013.01); *F41J 7/02* (2013.01); *G03B 21/10* (2013.01); *G03B 21/145* (2013.01); *F41J 7/00* (2013.01); *F41J 13/00* (2013.01)

(58) Field of Classification Search
CPC .................................... F41J 13/00; F41J 7/00
USPC ....................................... 273/406, 407, 359
See application file for complete search history.

(56) References Cited

U.S. PATENT DOCUMENTS 3,014,725 A * 12/1961 Lewis ........................ F41J 7/00
                                                                  200/47
3,614,102 A * 10/1971 Nikoden, Sr. .............. F41J 7/00
                                                                  273/406

(Continued)

FOREIGN PATENT DOCUMENTS

EP        1130351 A2    9/2001
JP        11101597 A    4/1999

(Continued)

OTHER PUBLICATIONS

International Searching Authority, PCT—Notification of Transmittal of the International Search Report and the Written Opinion of the International Searching Authority, or the Declaration, dated Mar. 8, 2018 for International Application No. PCT/US2017/062642, International Filing Date: Nov. 20, 2017.

*Primary Examiner* — Mark S Graham
(74) *Attorney, Agent, or Firm* — Hackler Daghighian Martino & Novak

(57) ABSTRACT

A system for projecting an image of a target is provided. In one embodiment, the system comprises a rail having a longitudinal axis; a target carrier coupled to the rail such that the target carrier can translate along the longitudinal axis of the rail; a motor and motion controller coupled to the target carrier wherein the motor is configured to cause the target carrier to translate along the longitudinal axis of the rail; a projector carrier coupled to the rail and held in fixed relational position to the target carrier; and a projector affixed to the projector carrier and oriented to point back towards the target carrier. In some embodiments, one or more cameras may also be added to the target carrier, projector carrier, or both.

13 Claims, 4 Drawing Sheets

(56) References Cited

U.S. PATENT DOCUMENTS

| | | | |
|---|---|---|---|
| 4,605,294 A | 8/1986 | Bourdier et al. | |
| 4,889,346 A * | 12/1989 | Destry | F41J 7/00 |
| | | | 273/406 |
| 5,924,867 A * | 7/1999 | Lautsbaugh | F41J 3/0004 |
| | | | 434/11 |
| 5,967,522 A * | 10/1999 | Corcoran | F41J 7/02 |
| | | | 273/406 |
| 8,006,981 B2 * | 8/2011 | Gibson | F41J 9/02 |
| | | | 273/359 |
| 9,157,706 B2 * | 10/2015 | Shea | F41J 7/06 |
| 9,360,283 B1 | 6/2016 | Tejada et al. | |
| 10,048,043 B2 * | 8/2018 | Rahnnanian | F41J 2/00 |
| 2013/0341869 A1 * | 12/2013 | Lenoff | F41J 9/02 |
| | | | 273/406 |

FOREIGN PATENT DOCUMENTS

| | | |
|---|---|---|
| KR | 1020110016748 A | 2/2011 |
| KR | 1020110056019 A | 5/2011 |
| WO | 2016014998 A1 | 1/2016 |

* cited by examiner

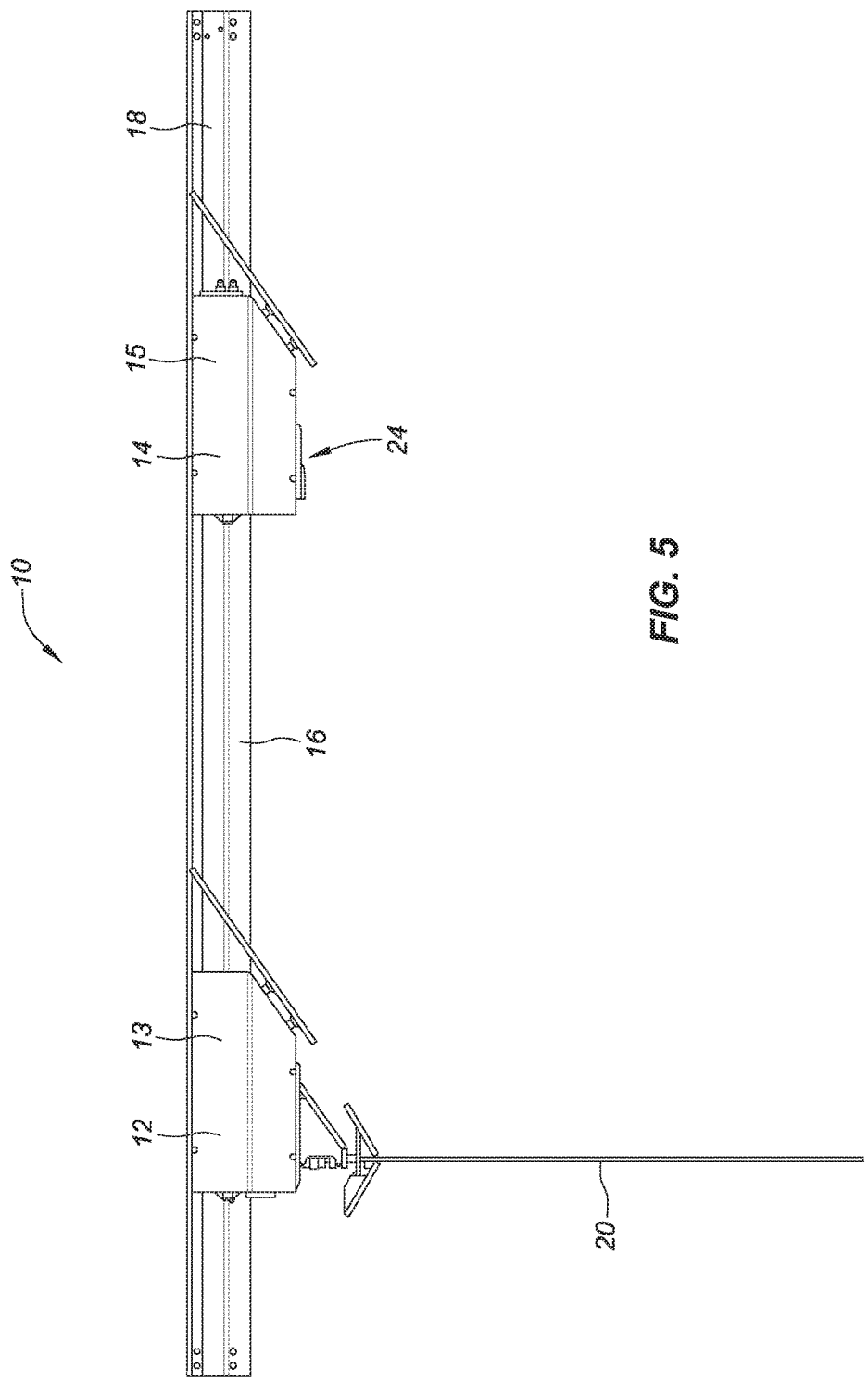

MOBILE TARGET CARRIER FOR GUN RANGE WITH COUPLED MOBILE PROJECTOR

FIELD

The present patent document relates generally to target carriers. More specifically, the present patent document relates to mobile target carriers for gun ranges that includes a coupled mobile projector.

BACKGROUND

Movable targets and movable target carriers used both indoors and outdoors are well established in the market. They include products made both by Meggitt Training Systems and several other competitors in the market. In addition, there are systems that use stationary projectors to project onto mobile target carriers. Prior art systems use projectors sitting on a tripod or use a fixed installation overhead. None of these systems can maintain the relative distance between the target carrier and the projector while the target is simultaneously moving.

One issue with a fixed projection system for target shooting is related to focusing the image on the target. The fixed projector has a limited focal range and in order to make the target look farther away, projectors typically must project a smaller image. This is because the target cannot be easily moved through a wide range and still be in the focus of the projector. In addition, if the target is moved farther away from the fixed projector, the shooter observes a diminished light density on the target, further decreasing usability. This creates a shooting experience that is not as realistic as shooting at the real distance and is thus, less desirable.

Moreover, as the target is retracted towards the shooter such that the shooter can evaluate his performance by comparing his bullet strikes to the targets, the images simply disappear as the target moves out of range of the projector focus. Consequently, the shooter cannot evaluate his performance.

To this end, it would be desirable to have a moving target carrier that can work with a projection system and still move through a wide range of positions while maintaining a sharp focused image on the target with a consistent light density.

SUMMARY OF THE EMBODIMENTS

One object of the embodiments of the present patent document are to provide a system for projecting an image of a target. The systems described herein include both moveable target carriers and moveable projectors. This allows the shooter to adjust the shooting distance while still maintaining all the advantages of a projection system.

Shooters on the same range typically will practice at varying distances. A moveable projection system alleviates the need for multiple projectors at varying distances to accommodate the moving target. By maintaining a fixed distance to the target, the scale of the projected images is also preserved, enabling projection at known scale, no matter the shooting distance. In addition, using a projector in conjunction with a camera system (either collocated with the movable projector, or not) facilitates simpler machine vision algorithms to located bullet holes in paper targets. These are just a few of the advantages to the systems and methods described herein and numerous other advantages will be obvious in view of the detailed description that follows.

Some embodiments of the system for projecting an image comprise a rail having a longitudinal axis; a target carrier coupled to the rail such that the target carrier can translate along the longitudinal axis of the rail; a motor and motion controller coupled to the target carrier wherein the motor is configured to cause the target carrier to translate along the longitudinal axis of the rail; a projector carrier coupled to the rail and held in fixed relational position to the target carrier; and a projector affixed to the projector carrier and oriented to point back towards the target carrier.

In preferred embodiments, a strut spans between the target carrier and the projector carrier and rigidly affixes the target carrier to the projector carrier. In some embodiments, a single translation motor and motion controller controls the motion of both the target carrier and projector carrier.

In some embodiments of the system, a ballistic shield is coupled to the front of the projector carrier. In some embodiments, a ballistic shield may be coupled on the front of the target carrier.

For a number of potential uses including automatic scoring and relaying an image of the target to a web based interface near the shooter, the system may further comprise a camera coupled to the projector carrier and oriented to observe a target held by the target carrier. The system may also include a camera coupled to the target carrier and oriented to observe the target.

Preferably, the target carrier and projector carrier are each held in separate housings spaced apart from each other along the longitudinal axis by twelve inches or more. The projector carrier may be considered a type of "trailer" or "caboose" to the target carrier. In embodiment with two separate housings, a strut may be the only structure between the housings. The strut may rigidly affix the target carrier to the projector carrier.

In some embodiments, the strut is designed to telescope or collapse along the longitudinal axis. The ability of the strut to collapse may be user selectable.

In another aspect of the present patent document, a system for projecting an image of a target is provided. The system comprises: a first housing having a translation axis and an interface that runs along the translational axis that is designed to couple the first housing to a rail such that the first housing can translate along the rail; a second housing, distinct from the first housing and having a second translation axis and an interface that runs along the translation axis that is designed to couple the second housing to the rail such that the second housing can translate along the rail; a motor and motion controller coupled to one of the first or second housings and designed to translate the first or second housing along a rail; a target holder configured to hold a target coupled to the bottom of the first housing; and a projector coupled to the second housing and oriented towards the target holder.

The system may further comprise a strut coupled to the first housing and coupled to the second housing and designed to hold the first housing in fixed relation to the second housing. In embodiments with a strut, the strut may be rigidly affixed to both the first housing and the second housing.

In some embodiments, the second housing comprises a recessed pocket that extends up from the bottom of the housing and the projector is assembled to the housing in the recessed pocket.

In some embodiments, a ballistic shield is coupled to the housing and completely covers the profile of the second housing as viewed from the front of the system.

In another aspect of the embodiments described herein, a projector carrier designed for use with a target carrier is provided. In preferred embodiments, the projector carrier comprises: a housing having a top and a bottom and a front and a back; a first recess in the top of the housing designed to interface with a rail for translation of the housing along the rail; a second recess in the bottom of the housing; a projector coupled to the housing in the recess and facing towards the back of the housing; a ballistic shield coupled to the front of the housing wherein the ballistic shield completely covers the profile of the second recess when viewed from the front of the housing; and a strut of twelve inches or more coupled to the housing and extending away from the back of the housing.

In some embodiments, the first recess is V-shaped. However, the recess may be other shapes including semi-circular, square or rectangular to name a few.

In preferred embodiments, the projector is battery powered. In other embodiments, a power cable or commutation bar extends from a distal end of the strut down a length of the strut to the housing.

BRIEF DESCRIPTION OF THE DRAWING

FIG. 5 is a side view of the system for projecting an image of a target of FIG. 1.

DETAILED DESCRIPTION OF THE PREFERRED EMBODIMENTS

Figure 1:
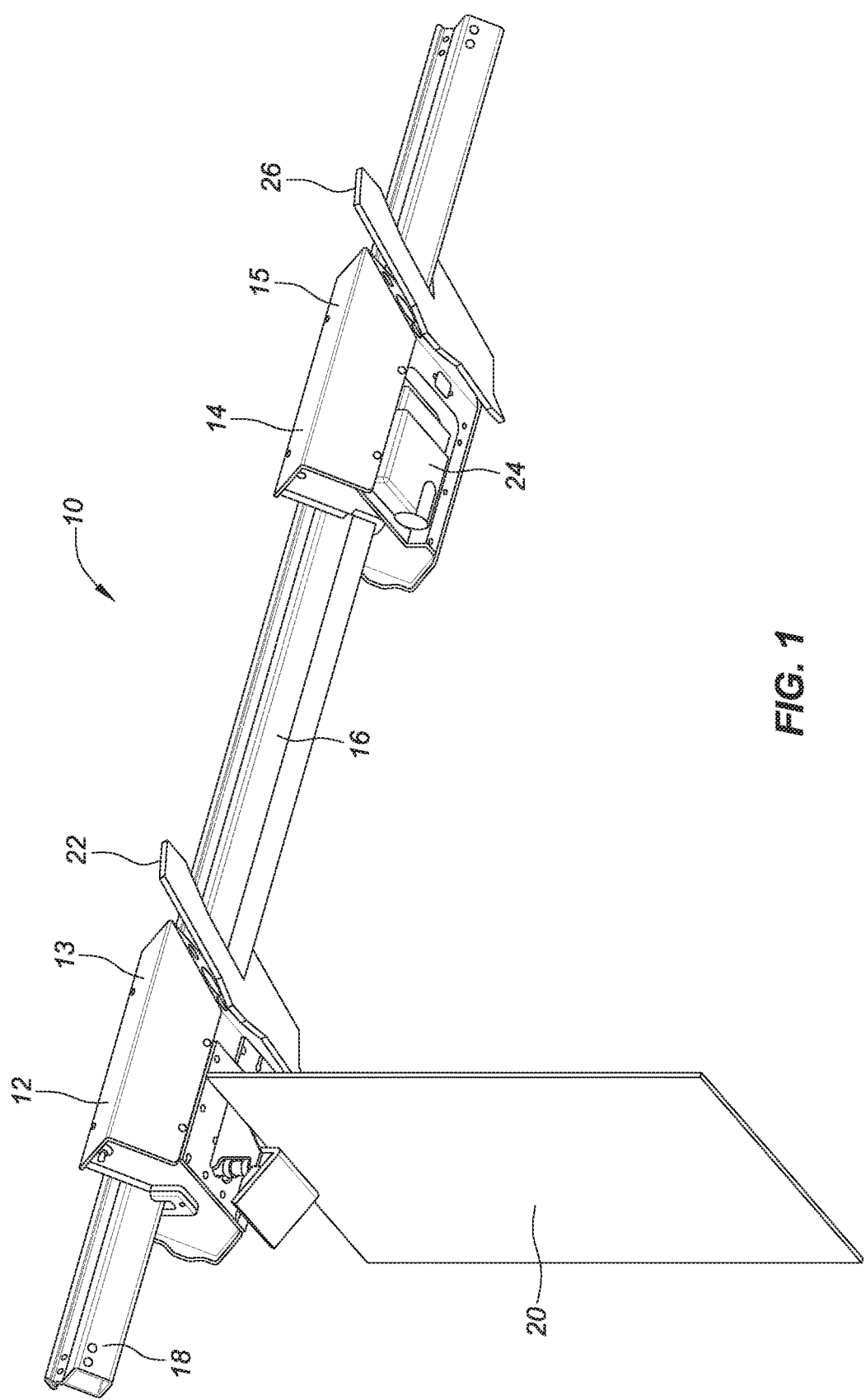
FIG. 1 is a bottom up perspective view of a system for projecting an image of a target including a mobile target carrier and a mobile projector in fixed relation each other.
Figure 3:
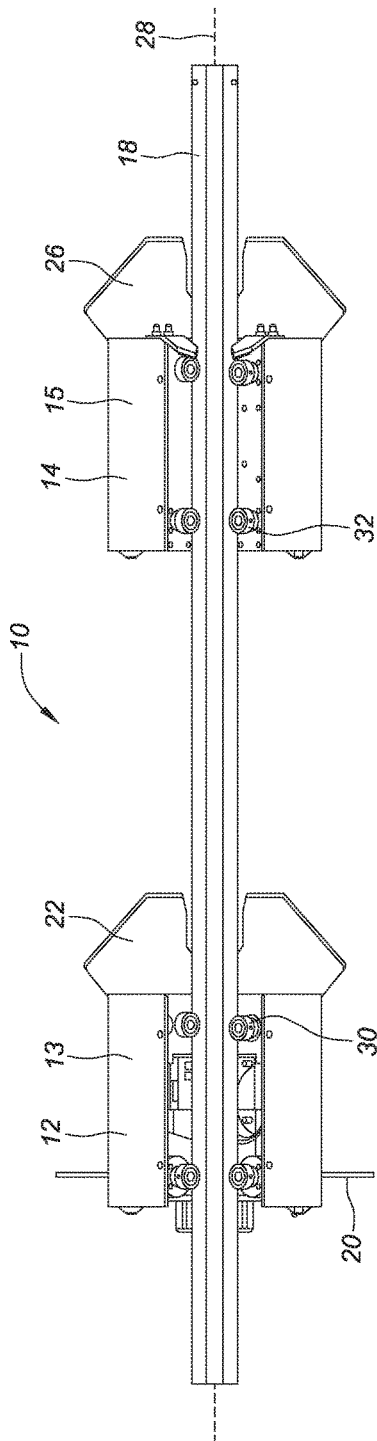
FIG. 3 is a top view of the system for projecting an image of a target of FIG. 1.
Figure 4:
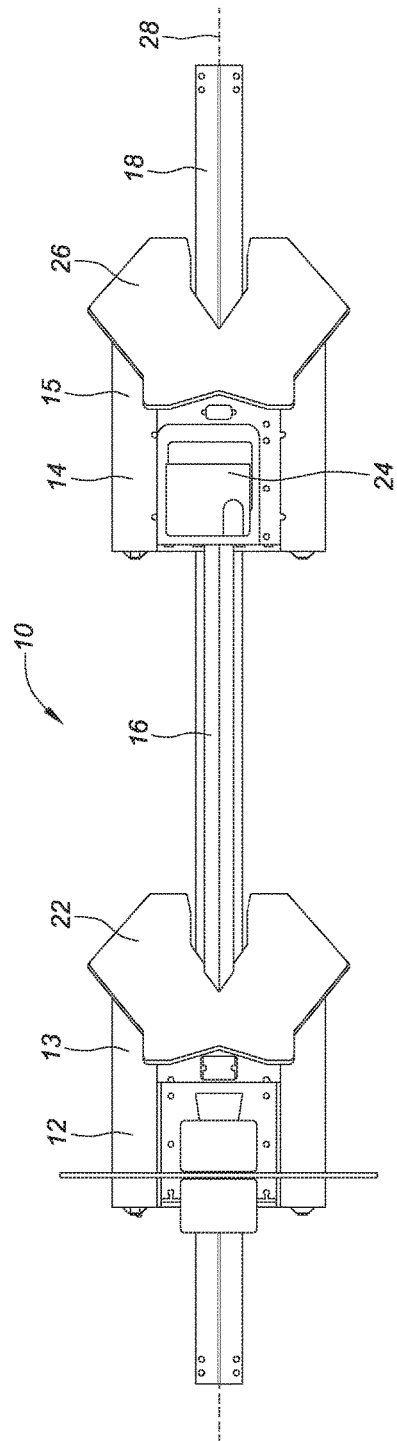
FIG. 4 is a bottom view of the system for projecting an image of a target of FIG. 1.

FIG. 1 is a bottom up perspective view of a system 10 for projecting an image of a target including a mobile target carrier 12 and a mobile projector 14 in fixed relation to each other. For purposes of this patent application, the term "front" will be used to mean the side closest to the shooter. The term "back" will refer to the side farthest away from the shooter. The term "top" will mean the side farthest from the target and the term "bottom" mean the side closest to the target. To help orient the reader, FIG. 3 illustrates a view of the top of the system of FIG. 1 and FIG. 4 represents a view of the bottom of the system of FIG. 1.

As may be seen in FIG. 1, the system 10 for projecting an image of a target comprises a target carrier 12 and a projector carrier 14. In the embodiment shown in FIG. 1, the target carrier 12 is made from a first housing 13 and the projector carrier 14 is made from a completely separate second housing 15. In the embodiment shown in FIG. 1, the first housing 13, which comprises the target carrier 12, is coupled to the second housing 15, which comprises the projector carrier 14, by strut 16. Although the embodiment shown in FIG. 1 includes a first housing 13 and a separate second housing 15 coupled by a strut 16, other embodiments may be made from a single housing that holds both the target and projector.

In embodiments with a single housing, strut 16 is not required because the two housings are integrated into a single housing. In embodiments that use a single much larger target carrier, mirrors may be used to reflect the projected image—as in a reflective short-throw projector. (with a mirror integral to the projector or the target carrier).

The dual housing design shown in FIG. 1 is beneficial of a singular housing design because it reduces weight and makes manufacturing easier. Manufacturing is easier because the two designs may be worked on separately and only integrated upon assembly. In addition, the dual housing design allows for an easy adaption of a projector carrier to an existing target carrier that may not have been originally designed to work with a mobile projector. Moreover, having a sufficient distance between the projector and the target enables use of more standard inexpensive projectors with direct projection.

While it is possible to project at steep angles like the ones required by a single housing design, such projectors can be expensive using mirrors and lenses to achieve that result in a compact target carrier 12. The increased standoff available in a dual housing design also enables the cameras to provide a higher image quality than if it were mounted in the target carrier 12 (near the target) itself.

In preferred embodiments, the system 10 is designed to traverse along a rail 18. As is known in the art, target carrier 12 may be designed to travel along a longitudinal axis of a rail 18. In other embodiments, a track, guide or other physical construct may be used to provide a physical guide and attachment point for the target carrier 12. In preferred embodiments, square stock may be used for the rail 18. In preferred embodiments, the rail 18 may be made from steel or more preferably stainless steel. Although rail 19 is preferably made from metal, other materials may be used such as plastic, nylon, rubber or other common construction materials.

The system 10 includes a target carrier 12. The target carrier 12 is designed to be coupled to the rail 18 such that the target carrier 12 can translate along the longitudinal axis of the rail 18. In preferred embodiments, the target carrier 12 may wrap at least partially around the rail 18 and rest on an upper surface of the rail 18 such that the target carrier 12 hangs from the rail 18. Preferably, the target carrier 12 may have rollers or some other type of interface that allows the target carrier 12 to move freely along the longitudinal axis of the rail 18. In order to interface with the rail 18, the projector carrier 14 and target carrier 12 may have a recess designed to mate with the rail 18. In some embodiments, the recess is V-shaped.

In preferred embodiments, the target carrier 12 holds a target 20. The target 20 typically hangs down from the target carrier 12 as shown in FIG. 1. In the embodiments described herein, the target 20 can simply be a blank target because the image of the target will be projected on the target 20 by the projector as explained in more detail below. In preferred embodiments, the target includes registration marks for camera correction.

In preferred embodiments, the target carrier 12 may be remotely controlled. To this end, the target carrier 12 may be coupled to a motor and motion controller. The motor and motion controller control the movement of the target carrier 12 along the rail 18. Operation may be via remote control and may use numerous different types of wireless communication as is well known in the art.

In preferred embodiments, the target carrier 12 may have a ballistic shield 22. The ballistic shield 22 is located on the front of the target carrier 12, on the shooter side of the target carrier 12, to shield the target carrier 12 from projectiles fired by the shooter. In preferred embodiments, the ballistic shield 22 obscures the entire profile of the target carrier 12 when viewed from the front. In even more preferred embodiments, the ballistic shield 22 is angled down at forty-five degrees or more to deflect any projectiles down and away from the target carrier 12. In preferred embodiments, the ballistic shield 22 is made from steel and more preferably an abrasive resistant grade of steel, for example AR500 steel may be used. AR500 is an abrasive resistant ("AR") steel with a Brinell hardness of 500. Although the composition of AR500 may vary slightly, it commonly comprises C—0.30%, Si—0.70%, Mn—1.70%, Cr—1.00%, Ni—0.80%, Mo—0.50% and B—0.004%. In other embodiments, other metals may be used including stainless steel, although any metal may be used.

The system 10 also includes a projector carrier or trailer 14. As may be seen in FIG. 1, the projector carrier 14 includes a projector 24. Including a projector offers the possibility of creating not just regular stationary target images but also interactive simulations. In operation, the projector can project any number of images on the target 20 including anything from traditional static bullseyes to images of perpetrators to full live action movies or images with moving targets.

The projector carrier may have a recess extending up from the bottom of the projector carrier 14 and the projector 24 may be mounted in the recess. Mounting the projector 24 in a recess on the bottom of the projector carrier 14 further protects the projector 24 from stray projectiles that may be ricocheting around the shooting range. In preferred embodiments, the projector 24 is affixed to the projector carrier 14 and oriented to point back towards the target carrier 12. This orientation allows the projector 24 to illuminate the target 20.

The projector carrier 14 is held in fixed relational position to the target carrier 12. To this end, when the target carrier 12 is moved along the rail 18, or other guide, the projector carrier 14 is moved in exactly the same amount and in the same direction such that the distance between the target carrier 12 and the projector carrier 14 is maintained.

There are numerous ways the fixed relationship between the target carrier 12 and the projector carrier 14 may be maintained. In the embodiment shown in FIG. 1, the projector carrier is also coupled to rail 18. In this particular embodiment, the projector carrier 14 is coupled to the rail 18 in a similar manner as the target carrier 12. However, in preferred embodiments, the projector carrier 14 is not powered and cannot move on its own but instead is tethered, connected, coupled or fixed to the target carrier 12. In the embodiment shown in FIG. 1, the projector carrier 14 is coupled to the target carrier 12 by strut 16.

In the embodiment of FIG. 1, strut 16 is rigidly affixed to both the target carrier 12 and the projector carrier 14. The strut 16 may be any type of rigid connector like a piece of angle iron with the appropriate brackets or a more significant structure like an I--beam or box beam as just a few examples. In preferred embodiments, the strut 16 is made from metal and more preferably from steel or stainless steel although other material may be used.

One of the issues with having the projector carrier rigidly affixed in front of the target carrier is the inability of the shooter to reach the target when the target is in the home position. When the target carrier is brought all the way back to the shooter, the target carrier will be prevented from getting close enough to the shooter to allow the shooter to change the target because it will be obstructed by the projector carrier 14. Accordingly, in some embodiments, the strut 16 may be selectively telescoping or collapsible. In embodiments with a collapsible strut 16, the shooter may press a button or switch to allow the strut 16 to collapse. In another embodiment, the rigid strut may decouple from one or both of the target carrier 12 or projector carrier 14. In some embodiments, the strut 16 may slide inside. The retracting strut enables the target carrier 12 and projector carrier 14 to be close to one another in the home position—then extend out when used on the range.

In yet other embodiments, the target carrier 12 and projector carrier 14 may not be rigidly connected. Instead, the projector carrier 14 may have its own motor and motion controller and the relative distance maybe maintained between the target carrier 12 and the projector carrier 14 by causing the projector carrier 14 to follow, copy or shadow the movements of the target carrier 12. In preferred embodiments, the motors and motion controllers are linked through software to copy each other's motions. The embodiment is not as desirable because it requires multiple motors and motions controller and complicated coordination routines.

As discussed above, the relative distance between the target carrier 12 and the projector carrier 14 may be maintained by mounting both in a single rigid structure or single housing. This of course maintains the required relative distance but as expressed above, has other disadvantageous.

In order to provide the movement of the target carrier 12, the system 10 includes a translation motor and motion controller to control the motion of both the target carrier 12 and projector carrier 14. In preferred embodiments, only a single motor and motion controller is needed. In most embodiments, the motor and motion controller are located in the target carrier 12 and the projector carrier is just free-wheeling guided by a rigid link between the target carrier 12 and the projector carrier 14. However, in some embodiments the motor or motion controller may be located in the projector carrier 14 and the target carrier 12 may be free-wheeling.

Similar to the target carrier 12, the projector carrier 14 may also include a ballistic shield 26 on the front of the projector carrier 12. The ballistic shield of the projector carrier 12 can have a similar design and shape as the ballistic shield 22 on the target carrier.

In some embodiments, a camera is coupled to the projector carrier 14 and oriented to observe a target 20 held by the target carrier 12. The camera may be used to relay an image of the target to a screen the shooter can see. The camera may also be used to do target hit analysis. Including a camera offers the benefit for a shooter to view the target remotely through a webcam style interface.

Figure 2:
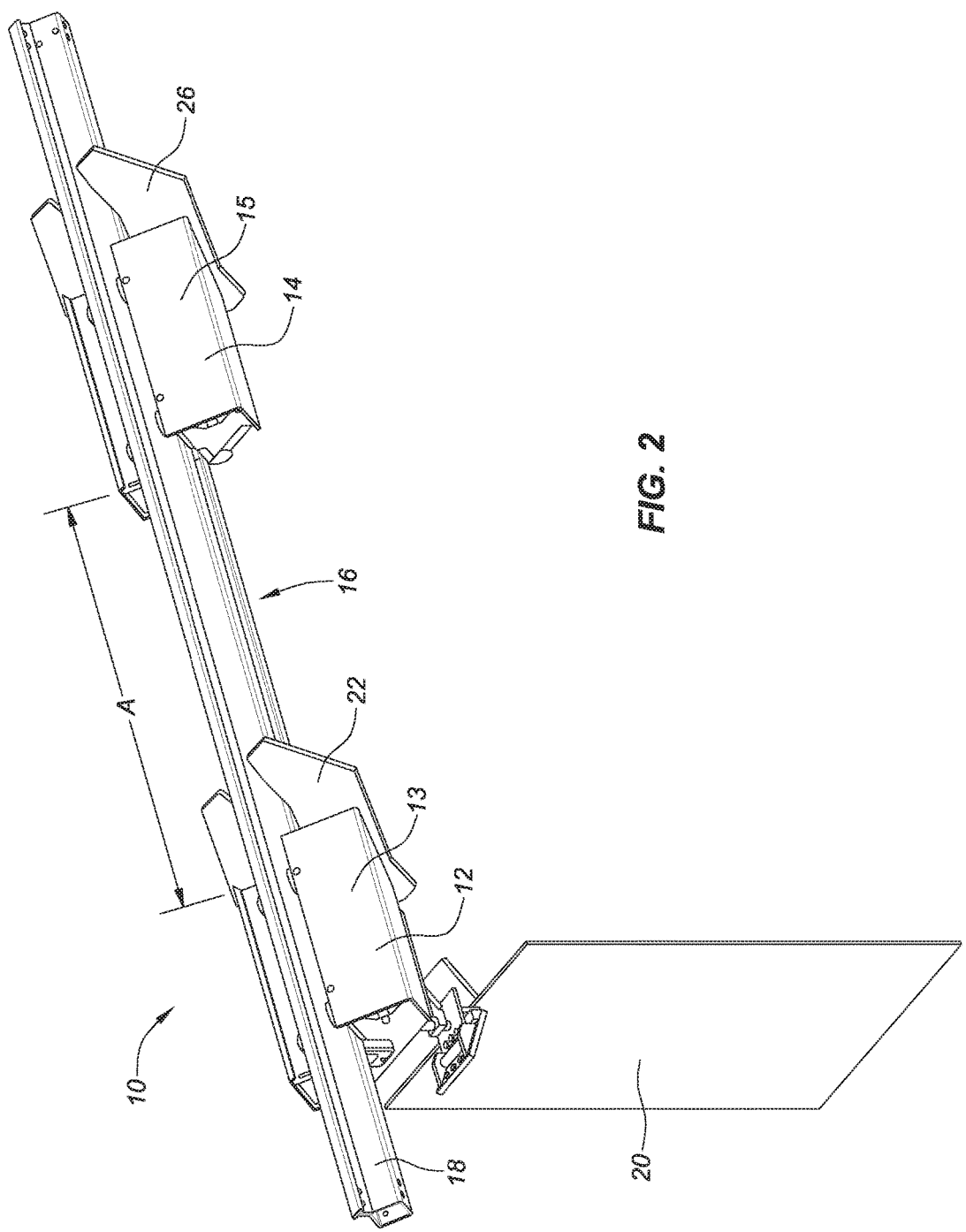
FIG. 2 is a perspective view of the system for projecting an image of a target of FIG. 1 from a top down angle.

FIG. 2 is a perspective view of the system 10 for projecting an image of a target of FIG. 1 from a top down angle. As may be seen in FIG. 2, the target carrier 12 and projector carrier 14 may be each held in separate housings 13 and 15 respectively. The first housing 13 and second housing 15 may be spaced apart from each other along the longitudinal axis by twelve inches or more. The distance between the first housing 13 and the second housing 15 has been labelled A in FIG. 2. This spacing is typically set such that the height of the projected image matches the desired height and brightness of the projected image.

As explained above there are a number of ways to maintain the relative distance between the target carrier 2 and the protector carrier 14. However, in preferred embodiments, the system comprises a first housing 13 and a second housing 15 and a strut 16 coupled to the first housing 13 and coupled to the second housing 15 and designed to hold the first housing 13 in fixed relation to the second housing 15.

FIG. 3 is a top view of the system 10 for projecting an image of a target of FIG. 1. As may be seen in FIG. 3, the rail 18 has a longitudinal axis a.k.a. translation axis 28. As may be seen in FIG. 3, each of the first and second housings have an interface that runs along the translational axis that is designed to couple the housings to the rail 18 such that the first housing 13 and the second housing 15 can translate along the rail 18. In FIG. 3, each of the first and second housings have a plurality of rollers 30 and 32 that allow the housings 13 and 15 to translate along the rail 18 up and down the translation axis 28.

As may be seen in FIG. 3, the first housing 13 has a motor and motion controller coupled therein that allows the first housing 13, and thus the second housing 15 via the strut 16 that connects the two housings, to translate along a rail 18.

FIG. 4 is a bottom view of the system for projecting an image of a target of FIG. 1. As may be seen in FIG. 4, the bottom of the second housing 15, which serves as the projector carrier 14, includes a recess that extends up from the bottom of the second housing 15. In the embodiment shown in FIG. 4, the projector 24 is coupled to the second housing 15 in this recess and is oriented towards the target holder.

In preferred embodiments, the projector 24 is battery powered. This allows the projector carrier 14 to be mostly power free. In preferred embodiments, the batteries are rechargeable and when they run low, can simply be recharged. Recharging may occur in place my plugging a charger directly into the projector and charging the batteries on their mounts or the batteries may be removed and recharged. In some embodiments, replacement batteries may be used such that there is no down time for the system and one set of batteries may be used while the other set is charging.

In some embodiments, the projector carrier 14 may receive power from the target carrier 12. In such embodiments, a power cable or communication bar may extend from the target carrier at a distal end of the strut from the projector carrier 14 down a length of the strut 18 to the housing. In some embodiments, the projector carrier 14 is also connected to the main target carrier 12 via other wires that connect the two and are embedded behind the attachment link—and therefore ballistically protected. These wires may be used to carry not only power but also data between the projector carrier and the target carrier.

In operation, the motor and motion controller receives a signal to indicate that the target carrier 12 should translate to a new position. The signal may be received via an IEEE 802.11 link, Bluetooth, radio signal, infrared signal or any other type of wireless signal. Both the target carrier and projector carrier may be connected to a wireless communications network either independently or as one node. The motion controller and motor translates the target carrier 12 to a new position and the projection carrier 14 is maintained in the same relative position to the target carrier 14 via the rigid strut 16 that forces the projection carrier 14 to move in tandem with the target carrier 12.

If standard projectors are used in the projection carriers 14, the standard projector will often project an image beyond the borders of the target and therefore, into the adjacent shooting lanes—potentially causing interference with the training in the adjacent shooting location. Therefore, in some embodiments, the projector carrier 14 may further include a mechanical system to occlude the sides of the projected image ahead of the projection lens. These "blinders" stop the projected image from spilling out on the side. However, by adjusting these blinders outward, the projected display can be widened to project up to and beyond the lane boundary. In special cases, a shooting range with several projection units set to the same range can be setup to provide a continuous panoramic projection across multiple lanes.

The cameras and projector mounted on the projector carrier 14 may also apply a standard keystone image correction on the projected image and the captured image respectively.

In embodiments that include a camera, the camera may also be used for shot scoring. There are several technologies that are available for use in shot scoring—Acoustic Box Targets, and Line Scan systems to name a couple. In embodiments that include shot scoring, the system may be adapted to further include a shot scoring subsystems. In preferred embodiments, the shot scoring system may be mounted on the projector carrier 14. In other embodiments, the shot scoring system may be mounted on the target carrier 12. One method of shot scoring uses standard machine vision to detect bullet holes through standard image comparison (e.g. TargetVision). By using the projector as the light source instead of ambient indoor lighting or the sun, the bullet detection algorithms becomes more accurate. By capturing multiple images of the target with changing projected colors, the fidelity of the shot location algorithms is greatly improved.

Detection of shot holes on traditional targets with images can be difficult. Light/Dark multicolored sections of the target are normally difficult to detect bullet holes in. This can be made simpler when the target image is projected with a projector. When shooting, the projector projects an image on the target. But, to facilitate simpler detection of holes in the target paper, the image can be temporarily changed to a known reference image (e.g. blank white, color, etc. . . . ) with fiducial markings. The software in the camera measures the relationship of the newly detected bullet hole in relation to the reference fiducials. This ensures that a high accuracy is maintained between the target image that was shot just previously and the bullet location that was measured. Even if the paper is later moved, software can record shot location in reference to the target image that was projected at the time of the shot. This image detection method of altering the image temporarily to measure the bullet location may be actuated manually by a user input or automatically through a sensor that detects a shot has been fired such as a microphone, microwave sensor, optical sensor, etc.

In yet other embodiments, shot detection may be aided by illuminating the target from the rear with an infrared light source that shines through the bullet holes. In order to aid shot detection, additional cameras may be added to the system including cameras on the target carrier 12 or multiple cameras on the projector carrier 14. In embodiments with camera's mounted on the target carrier, the camera may also be used to detect laser pulses from simulated weapons or coaxial mounted devices on live weapons.

The target carrier with projected images can also be configured to react and move depending on the shot location system finding. While it is common to find outdoor LOMAH ranges configured to move/react pop-up targets, this has never been done with targets that are projected images/videos.

Firearms training simulations that involve trainees interacting with videos are very popular. These videos have threats/targets move on the screen and trainees shoot at them. However, a movable target carrier offers a different possibility of scenarios whereby the threats/targets move in the projected image and the physical target-projected surface also moves. For example, a life size image could be projected on the target and then the target carrier could itself move, providing a more realistic target environment. As one example, zombies could be project full size on a target carrier and the target carrier could approach the shooter and provide a simulated threat. In such a scenario, the scale of the zombies would remain the same in the projected image.

In some embodiments, a second camera can be added to the target carrier and aimed rearward toward the shooter. This video can be recorded for after action review—e.g. a side-by-side recorded video of the target video with the shooter video. Preferably, this is used for coaching purposes to review how a shooter responded to imagery presented on the target. Alternatively, a live camera feed can be taken and presented on different targets—presenting an illusion of dueling with another shooter.

In other embodiments, one or both of these cameras on the target carrier (looking at the target and looking at the shooter) can be broadcast to other televisions/tablets/monitoring stations outside the shooting area for entertainment, security, training, teaching, instruction or other purposes.

What is claimed is:

1. A system for projecting an image of a target comprising:
    a rail having a longitudinal axis;
    a target carrier coupled to the rail such that the target carrier can translate along the longitudinal axis of the rail;
    a motor and motion controller coupled to the target carrier wherein the motor is configured to cause the target carrier to translate along the longitudinal axis of the rail;
    a projector carrier coupled to the rail separately from the target and held in fixed relational position to the target carrier by a strut that spans between the target carrier and the projector carrier; and
    a projector affixed to the projector carrier and oriented to point back towards the target carrier.

2. The system of claim 1, wherein a single translation motor and motion controller controls the motion of both the target carrier and projector carrier.

3. The system of claim 1, further comprising a ballistic shield on a front of the projector carrier.

4. The system of claim 3, further comprising a ballistic shield on a front of the target carrier.

5. The system of claim 1, further comprising a camera coupled to the projector carrier and oriented to observe a target held by the target carrier.

6. The system of claim 1, wherein the target carrier and projector carrier are each held in separate housings spaced apart from each other along the longitudinal axis by twelve inches or more.

7. The system of claim 5, wherein the only structure between the housings is a strut that rigidly affixes the target carrier to the projector carrier.

8. The system of claim 1, wherein the strut is designed to telescope along the longitudinal axis.

9. A system for projecting an image of a target comprising:
    a first housing having a translation axis and an interface that runs along the translational axis that is designed to couple the first housing to a rail such that the first housing can translate along the rail;
    a second housing, distinct from the first housing and having a second translation axis and an interface that runs along the translation axis that is designed to couple the second housing to the rail such that the second housing can translate along the rail;
    a strut coupled to the first housing and coupled to the second housing and designed to hold the first housing in a fixed relational position to the second housing;
    a motor and motion controller coupled to one of the first or second housings and designed to translate the first or second housing along a rail;
    a target holder configured to hold a target coupled to the bottom of the first housing; and
    a projector coupled to the second housing and oriented towards the target holder.

10. The system of claim 9, wherein the strut is rigidly affixed to both the first housing and the second housing.

11. The system of claim 9, wherein the second housing comprises a recessed pocket that extends up from the bottom of the housing and the projector is assembled to the housing in the recessed pocket.

12. The system of claim 11, further comprising a ballistic shield coupled to the housing and completely covering the profile of the second housing as viewed from the front of the system.

13. The system of claim 9, further comprising a camera coupled to the second housing and oriented to observe a target held by the target carrier.

* * * * *